United States Patent
Fontijn

(10) Patent No.: US 7,882,343 B2
(45) Date of Patent: Feb. 1, 2011

(54) OPTICAL DATA DISC WITH MULTIPLE BOOTING POINTS

(75) Inventor: Wilhelmus Franciscus Johannes Fontijn, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 1230 days.

(21) Appl. No.: 10/597,218

(22) PCT Filed: Jan. 14, 2005

(86) PCT No.: PCT/IB2005/050166

§ 371 (c)(1),
(2), (4) Date: Jul. 17, 2006

(87) PCT Pub. No.: WO2005/071685

PCT Pub. Date: Aug. 4, 2005

(65) Prior Publication Data

US 2008/0253270 A1    Oct. 16, 2008

(30) Foreign Application Priority Data

Jan. 20, 2004 (EP) .................. 04300029

(51) Int. Cl.
*G06F 9/00* (2006.01)
*G06F 9/24* (2006.01)
*G06F 15/177* (2006.01)
(52) U.S. Cl. .............................. 713/2; 713/1
(58) Field of Classification Search ........ 713/1, 713/2
See application file for complete search history.

(56) References Cited

U.S. PATENT DOCUMENTS

| 5,136,711 | A | 8/1992 | Hugard et al. |
| 5,802,363 | A | 9/1998 | Williams et al. |
| 6,631,468 | B1 * | 10/2003 | von Below ............. 713/2 |
| 7,162,629 | B2 * | 1/2007 | Zimmer et al. ........ 713/100 |
| 2003/0023844 | A1 | 1/2003 | Combe et al. |
| 2003/0084307 | A1 | 5/2003 | Schwartz |
| 2003/0135727 | A1 | 7/2003 | Challener et al. |

FOREIGN PATENT DOCUMENTS

| EP | 0817195 A2 | 7/1998 |
| EP | 1160655 A2 | 5/2001 |
| EP | 1168315 A2 | 2/2002 |
| JP | 01021673 A | 1/1989 |
| JP | 09274775 A | 10/1997 |
| JP | 2001338474 A | 7/2001 |
| WO | 9207319 A1 | 4/1992 |

OTHER PUBLICATIONS

Create Multi-Bootable CD-DVD image file, 2002, MagicISO.*
Jane's ATF Advanced Tactical Fighters, 1997, Electronic Arts, pp. 1-90.*
Stevens et al., "EL Torito—Bootable CD-ROM Format Specification", Version 1.0, Jan. 25, 1995, XP002276297.

* cited by examiner

*Primary Examiner*—Mark Connolly

(57) ABSTRACT

A booting procedure can take a long time and typically starts from a lead-in on a main data layer of an optical data disc. A Portable-Blue (PB) disc, a dual boot disc, includes a second data layer (304) from which application specific optical drives can boot directly. The dual boot disc still conforms to the prior art standard for PB for normal applications. The second boot (340) will cut in booting time for a specific application and will make application software small. is in particular relevant for gaming, for portable devices and relative specific applications.

20 Claims, 2 Drawing Sheets

US 7,882,343 B2

OPTICAL DATA DISC WITH MULTIPLE BOOTING POINTS

FIELD OF THE INVENTION

The present invention relates to a booting process of an optical disc. In particular, the invention relates to a disc format that enables a multiple booting from one disc.

Moreover the present invention relates to a system, an apparatus and an application enabled to support a multiple booting entry point using an optical disc.

The present invention is particularly relevant for applications that require a simple and quick mounting and booting procedure, in particular from a multiple layer optical data disc.

BACKGROUND OF THE INVENTION

Existing standards for optical discs allow a single boot format on one disc. A typical dual layer disc uses maps the address space of the second layer contiguous to the end of the first layer. A single boot sequence, starting on the inside of the first layer, mounts both layers. The layer transition is typically transparent to an application.

The existing mapping of the second layer is quite suitable for generic applications. Possibilities for rigorous application optimizations, however, are limited. A single disc has typically been optimized for generic use. A single disc suitable for both generic and application specific use turns out to be difficult to realize and is not very practical in usage. For one, an application specific use of a disc is difficult, as it first has to follow generic use conventions before proceeding to the application specific usage. This will cause a costly overhead in the specific application. Also this may cause the specific application to spend quite some time on performing tasks that are of no or limited relevance to the specific application.

SUMMARY OF THE INVENTION

It is, accordingly, an object of the present invention to provide an optical disc with a multiple of entry points for booting. This allows multiple booting formats and mounting areas on one disc.

It is another object of the invention to provide an optical disc that enables a simple and quick mounting process for specific applications while still providing a standard mounting process for regular applications. This allows a specific application to be developed that only requires little overhead for booting and mounting a disc.

It is yet another object of the invention to provide a system enabled to boot from a multiple of entry points from an optical disc.

In one preferred embodiment, the optical disc comprises a multiple layer disc wherein at least two layers have an entry point for booting. In a preferred embodiment, a first entry point for the booting is located at the beginning of the data layer one, while a second entry point for the booting is located at the beginning of data layer two. Each booting entry point allows an independent mounting of the optical disc or a part thereof. Any entry point for the booting is typically located at the beginning of the spiraled optical data layer.

In another embodiment, an optical disc is provided that comprises at least two mappings of logical address spaces.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

Throughout the drawings, the same reference numeral refers to the same element, or an element that performs substantially the same function.

DETAILED DESCRIPTION OF THE INVENTION

This section describes a detailed description of a best mode for implementation of the invention.

Figure 1:
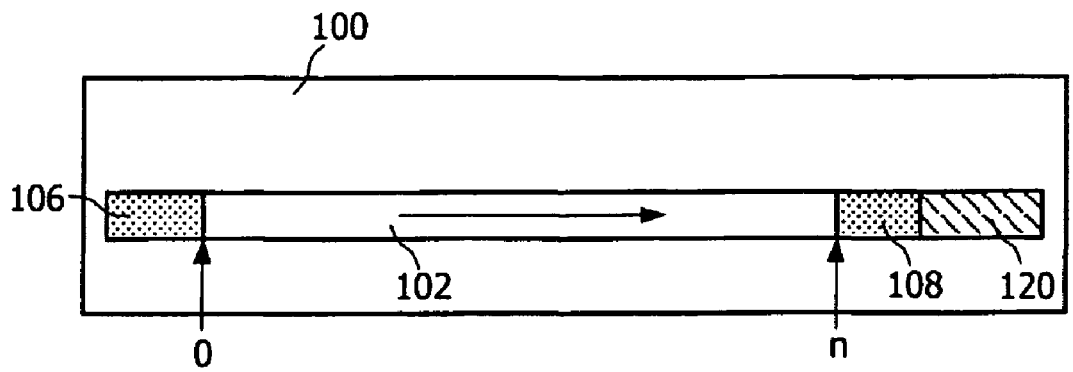
FIG. 1 shows a prior art single layer Portable Blue disc with as single boot entry point.

FIG. 1 shows a (prior art) single layer Portable Blue optical disc 100 (PB) with a single boot entry point. The boot entry point typically resides physically in a lead-in area 106 of optical data layer 102. Lead-in area 106 typically comprises an optical disc navigation area (DN) and a rights management area (RM). PB 100 also comprises a lead-out area 108 and a RIM 120. An area on PB 100 mapped as a logical address space, typically usable to an application, starts at logical address '0', directly after lead-in area 106, and stops until 'n', just before the lead-out area 108. The read direction for data is from lead-in area 106 towards lead-out 108 (direction of the arrow) as an optical disc typically is read & written in an outward (data) spiral. Lead-in area 106 typically resides close to the inner hole of the optical disc as lead-out 108 typically resides close to the outer boundaries of the optical disc.

Remarks: A logical address space usually starts at logical address '0'. The position of logical address '0' may vary, meaning that the physical address associated with logical address 0, i.e. the mapping may be different. The inventor uses in the specification of the invention, as example to explain a best mode of implementation, two possible positions for logical address '0' (however more positions are possible):

first sector after a first lead-in; and
first sector before a second lead-out.

The description of the disc in this specification is far from complete, as certain details of the disc that are regarded not essential for the explanation of the invention have been omitted. For instance, a lead-in typically also comprises a defect management area.

Figure 2:
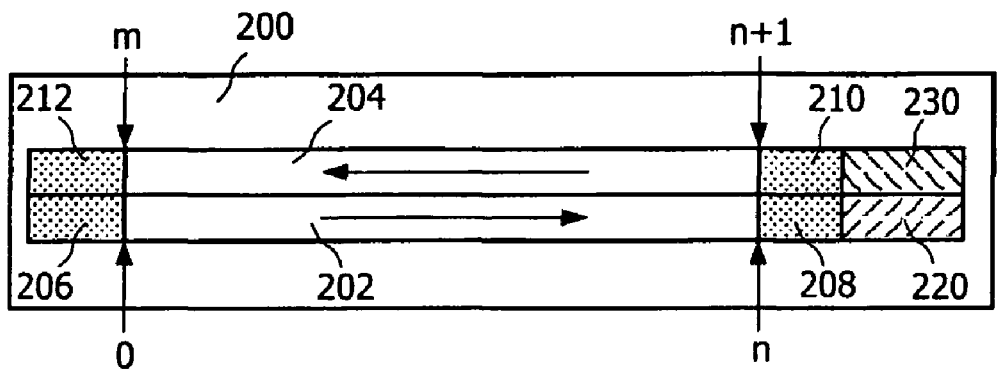
FIG. 2 shows a prior art dual layer Portable Blue disc with single boot entry point.

FIG. 2 shows a (prior art) dual layer Portable Blue optical disc 200 (PB) with a single boot entry point. The boot entry point typically resides physically in a first optical data layer 202 lead-in area 206. First lead-in area 206 typically comprises an optical disc navigation area (DN) and a rights management area (RM). PB 200 also comprises a first lead-out area 208 and a RIM 220. PB 200 also comprises a second optical data layer 204 that comprises a second layer lead-in area 212, a second layer RIM 230 and a second layer lead-out area 210. An area on PB 200 mapped as a logical address space, typically usable to an application, starts at logical address '0', directly after lead-in area 206, and stops until 'n', just before the lead-out area 208, then starts again at 'n+1' of layer two and the address space finally stops at 'm' of the second layer. The transition of the address space from 'n' to 'n+1' is viewed as a contiguous address space to an optical drive. The read direction for data for the second layer is from lead-out area 210 towards lead-in 212 (direction of the arrow); as an optical disc's second layer typically is read & written in an inward (data) spiral. Lead-in area 212 typically resides close to the inner hole of the optical disc as lead-out 210 typically resides close to the outer boundaries of the optical disc.

Figure 3:
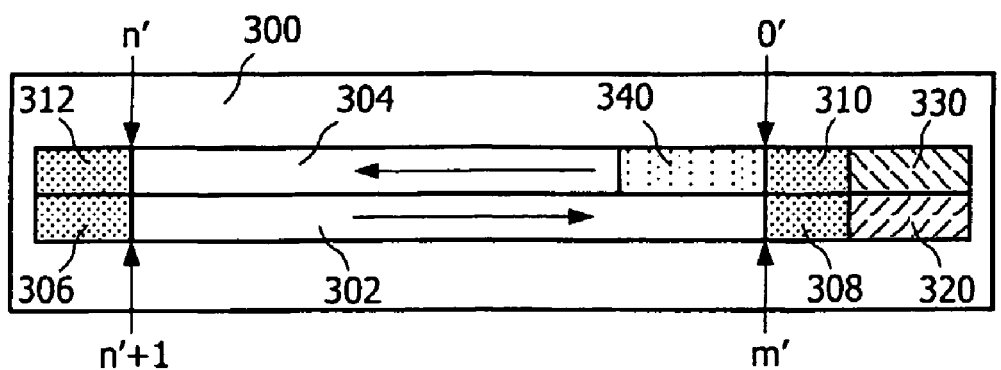
FIG. 3 illustrates a dual layer Portable Blue disc with dual boot entry point in accordance with the invention.

FIG. 3 illustrates a dual layer Portable Blue optical disc 300 (PB) with a dual boot entry point in accordance with the invention.

The first boot format is a standard format starting on the inside of the first layer (L0) 302. The second format is an application specific boot format starting on the outside of the second layer (L1) 304. To facilitate the disc 300 recognition in case of the application specific booting an application identifier (AppID, part of 310) is included in the lead-out (L0) of the second layer. L0 may now be regarded a lead-in, 310. This is the only measure that needs to be included in the PB standard to enable the proposed functionality.

The device that mounts the disc typically selects the booting sequence. A generic drive starts in the lead-in (LI) of the first layer. An application specific drive starts in the LO (310) of the second layer.

An application specific mount process may use a different logical address mapping from a generic mount process. The logical address zero (marked in FIG. 3 as 0') may be at the outside on the second layer 304.

The application specific mount process may mount completely different file system (if any) from the generic mount process. Having the file system and any other data required for the booting of the specific application on the outside ensures a mount process at maximum speed.

A first boot entry point typically resides physically in a first optical data layer 302 lead-in area 306. First lead-in area 306 typically comprises an optical disc navigation area (DN) and a rights management area (RM). First layer 302 also comprises a first lead-out area 308 and a RIM 320. PB 300 also comprises a second optical data layer 304 that comprises a second layer lead-in area 310, a second layer lead-out area 312 and a speed boot area 340 of an application specific boot format and a second layer RIM 330. Second layer lead-in-area 310 comprises an application-identifier (AppID). An application specific drive can automatically select described view of the second layer 304. The drive checks for compliance to its specific format requirements by looking for the appropriate AppID. If this is found the speed boot data (which may include a separate file system) is read. The logical address mapping maybe inverted for this mount type. The logical address 0 is located on the outside of the second layer (0') and the address space extends inward to n'. The address space of the first layer is then mapped contiguous to the address space of the second layer, running from n'+1 on the inside to m' on the outside. Lead-in area 310 is actually a lead-out area and lead-out area 312 is actually a lead-in area for a normal application. The second layer also comprises a second layer RIM 330 and a second layer lead-out area 312.

Dual boot disc 300 allows a very rich alternative use that is enabled by a simple measure (adding AppID) on an otherwise standard disc. Disc 300 enables a very rigorous application specific booting. A high-speed boot process is enabled for a specific application, without losing a generic applicability of the disc. Disc 300 supports two separate file systems on one disc. An application specific mount process may not even have a file system. Also two logical address-mapping schemes can be supported easily.

Figure 4:
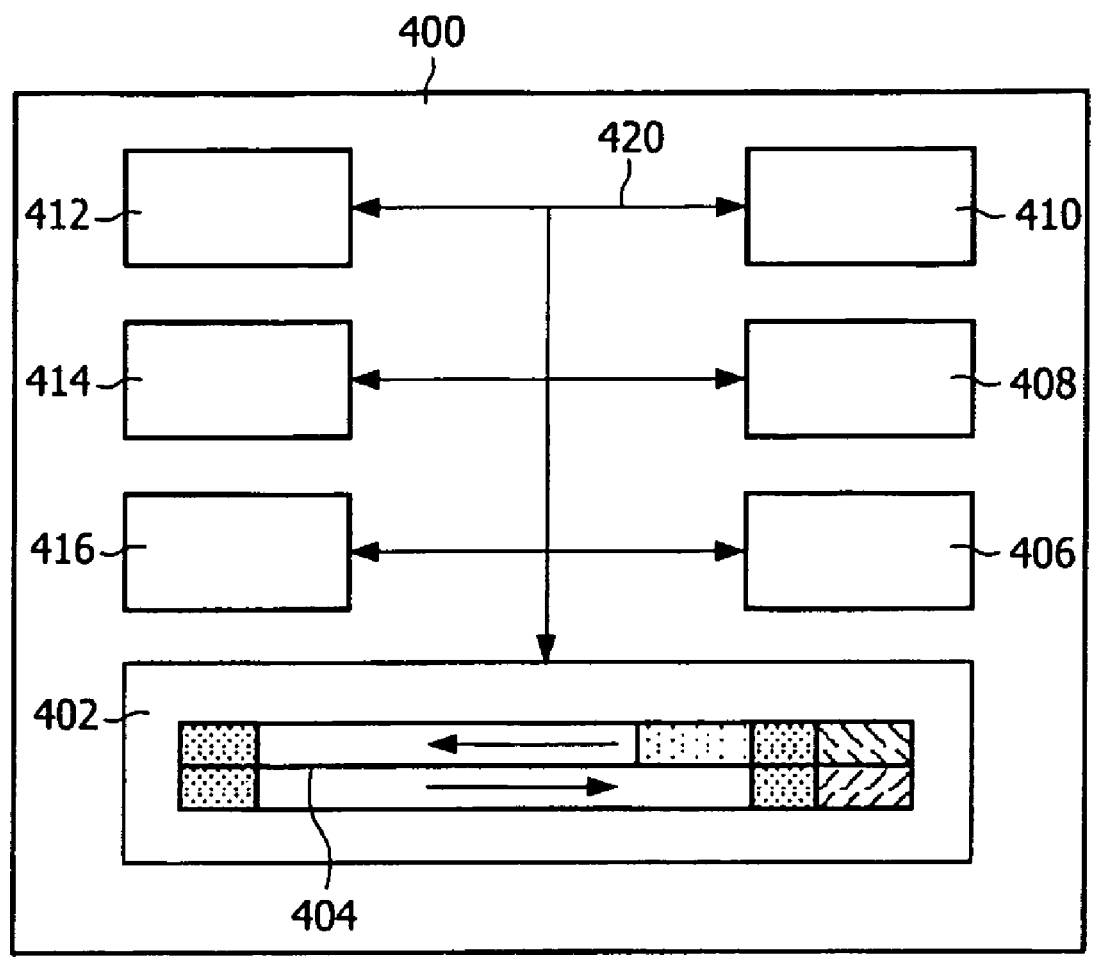
FIG. 4 shows a system that is enabled to boot from a second layer of an application specific optical disc in accordance with the invention.

FIG. 4 shows a system 400 that is enabled to boot from a second (or higher) layer of an application specific optical disc 404 that is in accordance with the invention.

System 400 comprises an optical drive 402 suitable for reading the optical disc 404, application boot software 406, memory 408, processor 410, User Interface 412 (UI; comprising a GUI, sound user interface etc.), User Input Device 414 (UID, comprising a mouse, keyboard etc), wireless interface 416 (e.g., based ob Bluetooth, 802.11 etc.) and interconnection 420. System 400 has been prepared to boot from a boot area from a second layer of the optical disc with drive 402 using application boot software 406. The application boot software 406, executed under control of processor 410, looks for an Application Identifier on the disk (e.g., located in the lead-out area of the second layer). Once this Identifier has been found, and application boot procedure starts. This may include setting up a disc area for an application use, requesting authorization to use the disc (according to an appropriate DRM scheme), e.g., using wireless interface 416, copying parts of the data from the disc to memory 408 for later use and execution, and setting up basic input and output interfaces that may include UI 412 and UID 414. Interconnection 420 includes a data/memory bus, a system control bus, and an IO bus. As the booting is specific for the system it can be made very dedicated to the system using, e.g., a dedicated filing system with its own logical address space mapping system. As a result a high speed booting is possible, which is advantageous for applications such as gaming, specific applications (such as a user or client customized application), and portable device applications etc. Also application software that needs to be developed can stay relative small and simple though powerful and fast.

Remark: A second mount point configuration is typically hidden from any host. E.g., a Personal Computer (PC) would typically mount from a first mount point but if you were to connect a drive that detects the second mount point preferentially, the PC may not even notice that the second mount point is used as the response from the drive appears to be normal.

The foregoing merely illustrates the principles of the invention. It will thus be appreciated that those skilled in the art will be able to devise various arrangements which, although not explicitly described or shown herein, embody the principles of the invention and are thus within its spirit and scope. For example, one of ordinary in the art will recognize that the particular structures shown in the figures are presented for ease of understanding, and that the functions of the various blocks may be performed by other blocks.

In like manner, one of ordinary skill in the art will recognize that alternative data discs can be devised to create a multiple boot disc by making changes in the configuration of the optical data discs as described. For instance, the inventor also envisions applying the invention to other optical disc formats than Optical Blue as well such as upcoming new formats as well as existing formats such as DVD, Blue-Ray, Magnetical Optical (MO) etc. In fact, the inventor envisions applying the invention to other data storage formats. In addition, the inventor envisions applying the invention to create a disc with more than two mount points, e.g., in case of a quadruple layer disc.

These and other data storage systems and discs and embodiments will be evident to one ordinary in the art in view of this disclosure, and are included within the scope of the following claims.

The invention claimed is:

1. An optical data disc comprising
a first boot area for installing a first operating system for booting the first operating system from the optical disc; and
a different second boot area, for installing a second operating system for booting the second operating system from the optical disc, the second operating system being independent of the first operating system and
wherein depending on an application the optical data disc is enabled to be booted from one of the first boot area and the second boot area;
wherein the optical data disc comprises a multi layer disc, and the first boot area resides on a first layer of the optical disc and the second boot area resides on a second layer of the optical data disc.

2. The data disc of claim 1, wherein the first boot area enables a first logical address-space mapping and the second boot area enables a second logical address-space mapping.

3. The data disc of claim 2, comprising one of a Portable Blue optical disc, a Blue-ray optical disc and a DVD optical disc.

4. The data disc of claim 2, comprising a speed boot area on the second layer.

5. A data disc, comprising
a first boot area; and
a second boot area, wherein depending on an application the disc is enabled to be booted from one of the first boot area and the second boot area
wherein the data disc comprises a multi layer data disc, and wherein the first boot area resides on a first layer of the data disc and the second boot area on a second layer of the data disc.

6. The data disc of claim 5, wherein the first boot area enables a standard boot and the second boot area enables an application specific boot.

7. The optical data disc of claim 5, wherein the second boot area comprises an application identifier.

8. The data disc of claim 5, wherein the first boot area resides on a lead-in area of the first layer and the second boot area resides on a lead-out area of the second layer.

9. The data disc of claim 8, wherein the lead-in area is located towards an inner side of the data disc and wherein the lead-out area is located towards an outer side of the disc.

10. A system comprising an optical data disc drive,
wherein the drive is enabled to use an optical data disc comprising a standard boot area for booting a standard operating system installed in the standard boot area and a different application specific boot area for booting an application specific operating system installed in the application specific boot area, the specific operating system being independent of the standard operating system, and
wherein the drive is enabled to boot from the application specific area, and
wherein the optical data disc comprises a multi layer disc and the standard boot area resides on a first layer of the optical disc and the application specific boot area resides on a second layer of the optical data disc.

11. The system of claim 10, wherein the drive is enabled to use a file system in accordance with the application specific boot area that facilitates a boot process that is substantially quicker than the standard boot process for booting the standard operating system.

12. The system of claim 10, wherein the data disc drive comprises one of a Portable Blue optical drive, a Blue-Ray optical drive and a DVD optical drive.

13. The system of claim 10, comprising at least one of a portable application, a custom application and a gaming application.

14. A system comprising a data disc drive, wherein the drive is enabled to use a data disc comprising a standard boot area and an application specific boot area, and wherein the drive is enabled to boot from the application specific area and wherein the drive is enabled to use a data disc comprising a first layer comprising the standard boot area and a second layer comprising the application specific boot area.

15. The system of claim 14, wherein the drive is enabled to use the data disc using a logical address-space mapping scheme, wherein a first logical address space starts on the second layer of the data disc.

16. The system of claim 14, wherein the drive is enabled to use the data disc that allows a multiple of logical address-space mapping systems.

17. An optical data disc comprising
a first boot area; and
a second boot area,
wherein in an application specific mount process the optical data disc enables an application specific boot from the second boot area,
wherein in a non-application specific mount process the optical data disc enables a standard boot from the first boot area,
wherein the optical data disc comprises a multi layer data disc, and the first boot area resides on a first layer of the optical data disc and the second area resides on a second layer of the optical data disc.

18. The optical data disc of claim 17, wherein the second boot area comprises an application identifier.

19. The optical data disc of claim 17, wherein the first boot area resides on a lead-in area of the first layer and the second boot area resides on a lead-out area of the second layer.

20. The optical data disc of claim 17, wherein the first boot area enables a first logical address-space mapping and the second boot area enables a second logical address-space mapping.

* * * * *